(12) United States Patent
Sugata

(10) Patent No.: US 6,501,034 B2
(45) Date of Patent: Dec. 31, 2002

(54) INTEGRATED CONNECTOR DEVICE INCLUDING A CABLE REEL AND COMBINED SWITCH SYSTEMS

(75) Inventor: Shoichi Sugata, Yokkaichi (JP)

(73) Assignee: Sumitomo Wiring Systems, Ltd., Yokkaichi (JP)

( * ) Notice: Subject to any disclaimer, the term of this patent is extended or adjusted under 35 U.S.C. 154(b) by 0 days.

(21) Appl. No.: 09/828,964

(22) Filed: Apr. 10, 2001

(65) Prior Publication Data

US 2001/0027913 A1 Oct. 11, 2001

(30) Foreign Application Priority Data

Apr. 11, 2000 (JP) .................................. 2000-109858

(51) Int. Cl.⁷ ................................................. H01H 9/00
(52) U.S. Cl. ........................ 200/61.54; 439/15; 439/164
(58) Field of Search .................... 200/61.54–61.57; 307/10.1; 439/15, 164

(56) References Cited

U.S. PATENT DOCUMENTS

| | | | | |
|---|---|---|---|---|
| 5,747,763 A | * | 5/1998 | Uchiyama et al. | 200/61.54 |
| 5,883,348 A | * | 3/1999 | Yokoyama | 200/61.54 |
| 5,936,215 A | | 8/1999 | Masuda et al. | 200/61.3 |
| 5,971,782 A | | 10/1999 | Masuda | 439/15 |
| 6,053,742 A | * | 4/2000 | Matsumoto et al. | 439/15 |
| 6,246,128 B1 | * | 6/2001 | Sugata | 307/10.1 |
| 6,267,610 B1 | * | 7/2001 | Sugata | 439/164 |

FOREIGN PATENT DOCUMENTS

JP   11297166   10/1999

OTHER PUBLICATIONS

English Language Abstract of JP 11–297166. Date: Oct. 29, 1999.

* cited by examiner

Primary Examiner—J. R. Scott
(74) Attorney, Agent, or Firm—Greenblum & Bernstein, P.L.C.

(57) ABSTRACT

An integrated connector device includes a cable reel, an encoder, and combined switch systems. It further includes a base shell including: a top wall portion with a central through-hole; an outer sidewall portion extending downwardly from the top wall portion and having first and second lever notches; and first and second partitions respectively provided at a predetermined distance from the outer sidewall portion. The cable reel includes a fixed body and a mobile body. The combined switch systems include a turn indicator-signal system and a lighting system respectively including turn indicator-signal and lighting levers. The cable reel is positioned in the base shell with their respective central axes aligned, such that the fixed body is positioned between the first and second partitions, the turn indicator-signal system is positioned between the outer sidewall portion and the first partition, the lighting system is positioned between the outer sidewall portion and the second partition, and the turn indicator-signal and lighting levers extend outwardly through the first and second lever notches.

8 Claims, 6 Drawing Sheets

INTEGRATED CONNECTOR DEVICE INCLUDING A CABLE REEL AND COMBINED SWITCH SYSTEMS

BACKGROUND OF THE INVENTION

1. Field of the Invention

The present invention generally pertains to an integrated device including a cable reel and combined switch systems for mounting in a steering wheel of an automobile.

2. Description of Background Information

Nowadays, a steering wheel usually contains an airbag and an inflator for inflating the airbag. The inflator is electrically connected to electrical circuitry mounted on a panel of an automobile via a cable reel known as a rotary connector. As shown in FIGS. 1 and 2, the cable reel includes an outer cylindrical body which constitutes a fixed body 2. The fixed body 2 is connected to combination switch bodies 3 linked to a steering column 4. The cable reel 1 also includes a mobile body 5, which constitutes an inner cylindrical body. The mobile body 5 is mounted into the fixed body 2 in a freely rotatable manner, and is further fitted into a steering wheel so as to form a hollow torus. The hollow torus contains a flat cable 6 arranged in a spiral. One end of the flat cable 6 is fixed to the fixed body 2, and the other end thereof is fixed to the mobile body 5, so that the signals passing through the flat cable 6 can be transmitted to outside. When the steering wheel is turned, the mobile body is rotated correspondingly clockwise or counter-clockwise. The flat cable 6 can follow the above rotation by winding or unwinding its spirals.

In a known steering wheel system, which includes a cable reel 1, combination switch bodies 3, a steering wheel and a steering column 4, a mobile body 5 mounted in the cable reel 1 is fixed to the lower end (as viewed in FIG. 2) of the steering wheel through a lobe (not shown in the figures). The fixed body 2, into which the mobile body 5 is mounted in a freely rotatable manner, is fixed on the upper face (as viewed in FIG. 2) of the combination switch bodies 3, and the combination switch bodies 3 are fixed to the steering column 4. The combination switch body 3 located on the right-hand side of the steering column (FIG. 1) carries a turn indicator-signal unit 7 (winker or blinker unit) which includes a turn indicator-signal housing 7a containing turn indicator-signal circuitry 7b such as a turn indicator-signal switch (winker switch). Likewise, the combination switch body 3 located on the left-hand side of the steering column (FIG. 1) carries a lighting unit 8 which includes a lighting housing 8a containing lighting circuitry 8b such as a light switch. The turn indicator-signal unit 7 and the lighting unit 8 further include a turn indicator-signal lever 7c and a lighting lever 8c, both projecting outwardly from the respective housings 7a and 8a.

One of the combination switch bodies 3 and a steering shaft 9 form a space under the cable reel 1. Accordingly, a cancel cam 10 and an encoder (steering angle sensor) 11 can be installed in this space, and mounted on the steering shaft 9.

However, in the above construction, the turn indicator-signal unit 7, lighting unit 8, cable reel 1, cancel cam 10 and encoder 11 are provided as corresponding individual units, and assembled together at a subsequent stage. Accordingly, each unit requires a housing and mounting means, e.g. bolts, by which it is linked to the other units. As a result, the number of parts used tends to increase greatly.

Further, the housing for these units tends to increase the height, diameter and weight of the construction, as does the configuration in which the cable reel 1 is mounted on the combination switch bodies 3. Moreover, the above units are typically supplied by different manufacturers. A sufficient degree of clearance must then be provided when these units are assembled. As a result, a space, otherwise unnecessary, must be taken into account, and the construction becomes more voluminous.

An object of the present invention is therefore to provide a structure requiring no unit-by-unit assembling. According to another aspect of the present invention, the structure of the integrated connector device is reduced to a minimum size and weight, by modifying the mounting position of the cable reel.

SUMMARY OF THE INVENTION

To this end, according to one aspect of the present invention, there is provided an integrated connector device including a cable reel and combined switch system. The integrated connector device further includes a base shell including: a top wall portion with a central through-hole; an outer sidewall portion extending downwardly from the top wall portion and having first and second lever notches; and first and second partitions respectively provided at a predetermined distance from the outer sidewall portion. The base shell has a central axis.

The cable reel of the present invention also includes a fixed body and a mobile body, and has a central axis.

The combined switch systems of the present invention may also include a turn indicator signal system and a lighting system respectively including turn indicator signal and lighting levers.

The cable reel is fitted into the base shell by joining the respective central axis, such that the fixed body is fitted between the first and second partitions, the turn indicator-signal system being fitted between the outer sidewall portion and the first partition, the lighting system is fitted between the outer sidewall portion and the second partition, and the turn indicator-signal and lighting levers are extended outwardly through the first and second lever notches.

Preferably, the mobile body of the cable reel contained in the base shell includes an upper portion, and the upper portion carries a cancel cam integrally formed therewith.

According to a further aspect of the present invention, the mobile body of the cable reel contained in the base shell includes a top wall portion, and the fixed body of the cable reel includes an outer sidewall portion. The top wall portion of the mobile body carries a main scale portion integrally formed therewith. There is provided an encoder between the outer sidewall portion of the fixed body and the outer sidewall portion of the base shell, but spaced from the positions where the turn indicator-signal and lighting systems are located, such that the encoder can detect the position of the main scale portion.

Suitably, the cable reel and the base shell are adapted to be joined to a steering shaft having a central axis, such that the central axes of the cable reel and base shell are the same as that of the steering shaft, and the turn indicator-signal system and the lighting system are placed at a predetermined position with respect to the central axis of the steering shaft.

As mentioned above, the present invention includes a base shell which contains a turn indicator-signal system including necessary functional parts, as well as a lighting system including necessary functional parts. These functional parts are no longer stored in separate housings as in the prior art, but incorporated into the base shell as an integral system thereof The space necessary for the separate housings can thus be eliminated. Further, the cable reel is fitted into the inner side (central axis side of the base shell) of the first and second partitions of the base shell, so that the height and width size of the integrated connector device is reduced, and the entire structure of the device becomes compact.

Further, the turn indicator-signal system and the lighting system are not stored in separate housings as a unitary entity, so that functional parts for these systems can be added or modified very easily.

Furthermore, when the above systems are adopted, it is no longer necessary to rely on the separate unitary entities which are often manufactured by different parts-makers. The space usually necessary for clearance between these unitary entities of different origins can thus be obviated, and the whole device can be miniaturized.

Further yet, the integrated connector device is configured such that the central axis of the base shell and that of the steering shaft are brought together, so that all members or systems to be incorporated into the base shell can be installed very easily at predetermined positions with respect to the central axis.

The encoder preferably includes a printed circuit board, and a sensor system connected thereto which includes a light-emitting element and a light-receiving element. A main scale is provided in a space formed between the light-emitting element and the light-receiving element, and rotated therein in conjunction with the mobile body, so that the steering angle can be detected. All these members are integrally molded in a resin.

The cancel cam and the main scale are integrally formed with the mobile body of the cable reel. Further, the encoder is disposed between the fixed body and the base shell, in ways that the structure of the integrated connector device is simplified and rendered more compact.

BRIEF DESCRIPTION OF THE DRAWINGS

The above, and the other objects, features and advantages of the present invention will be made apparent from the following description of the preferred embodiments, given as non-limiting examples, with reference to the accompanying drawings, in which.

DETAILED DESCRIPTION OF THE PREFERRED EMBODIMENTS

Figure 3:
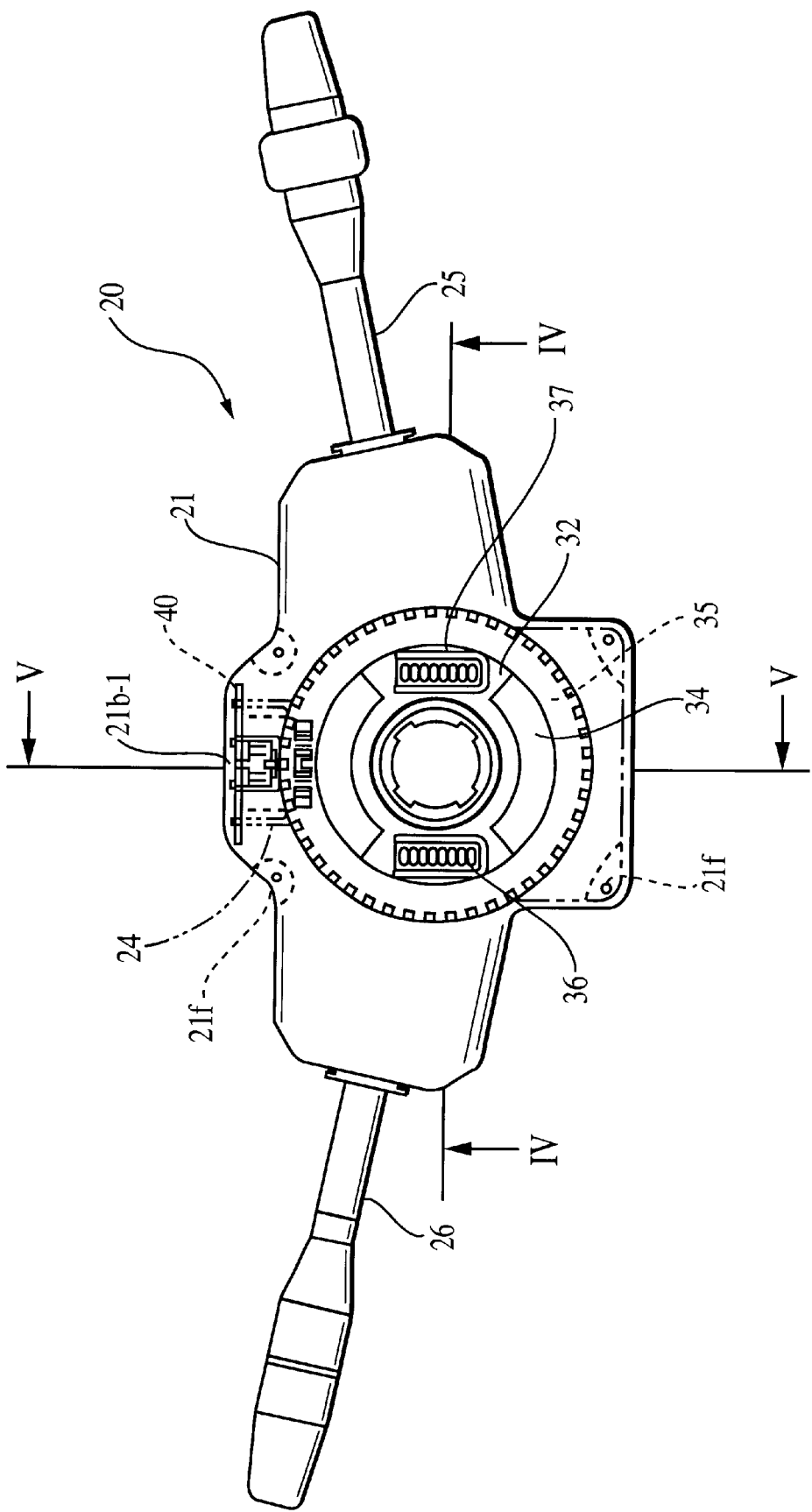
FIG. 3 is a top plan view of an integrated connector device according to the invention.

FIG. 3 is a top plan view of an integrated connector device 20 incorporating a cable reel and combined switch systems.

Figure 4:
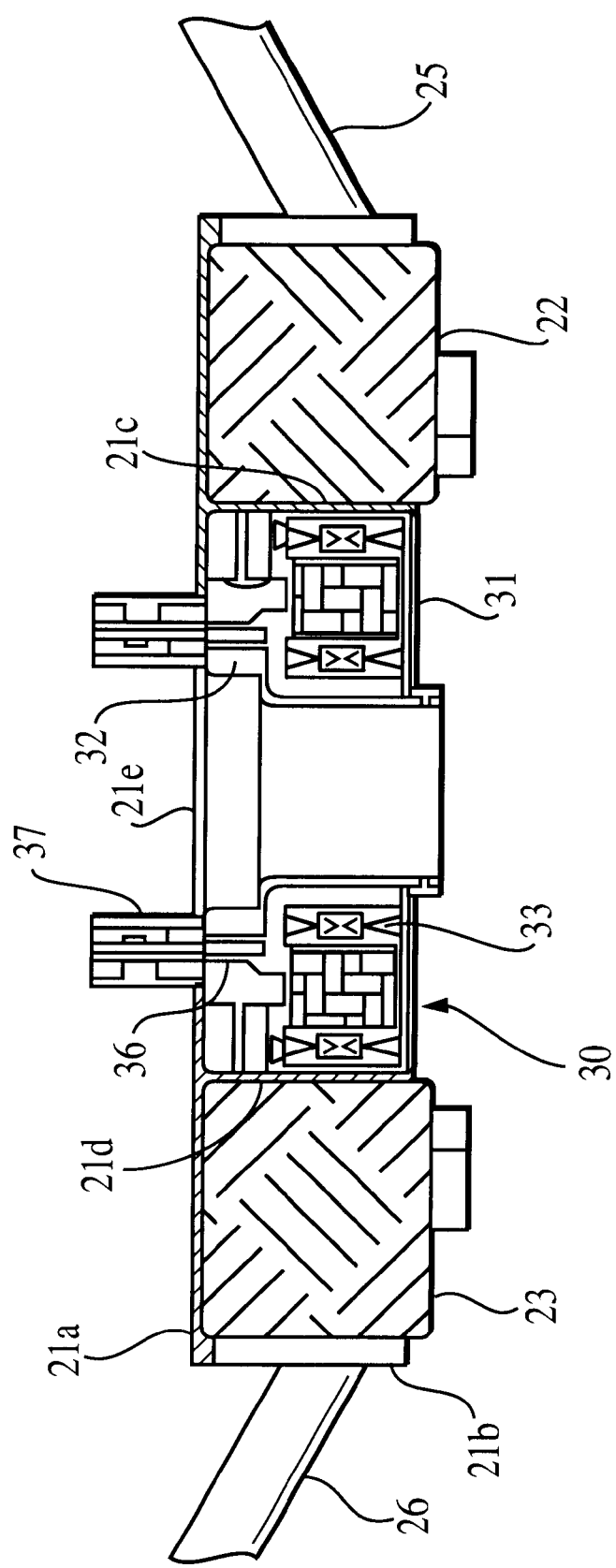
FIG. 4 is a cross-sectional side view taken along line IV—IV in the integrated connector device of FIG. 3.
Figure 5:
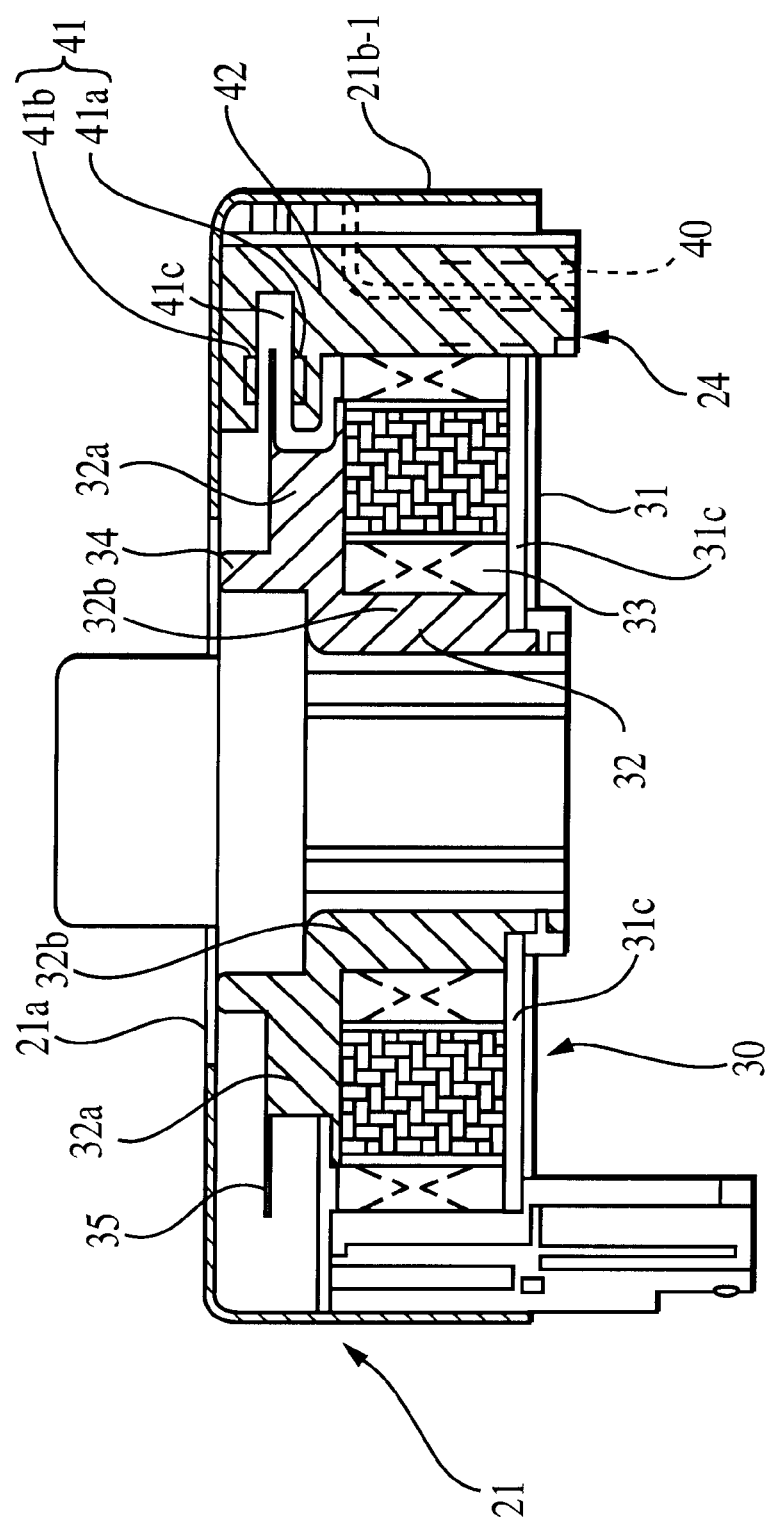
FIG. 5 is a cross-sectional side view taken along line V—V in the integrated connector device of FIG. 3.

FIG. 4 is a cross-sectional side view taken along line IV—IV in the device of FIG. 3. Likewise, FIG. 5 is a cross-sectional side view taken along line V—V in the device of FIG. 3. As shown in FIGS. 3 to 5, the integrated connector device 20 of the invention includes a base shell 21, which contains a cable reel 30, a turn indicator-signal system 22, a lighting system 23 and an encoder 24.

In this connector device 20, the turn indicator-signal system 22 and the lighting system 23 are installed in the peripheral zones of base shell 21 substantially distal and opposed to each other, with respect to the central axis of the base shell 21. The encoder 24 is installed in another peripheral zone of base shell 21, spaced from the turn indicator-signal system 22 and the lighting system 23.

Figure 6:
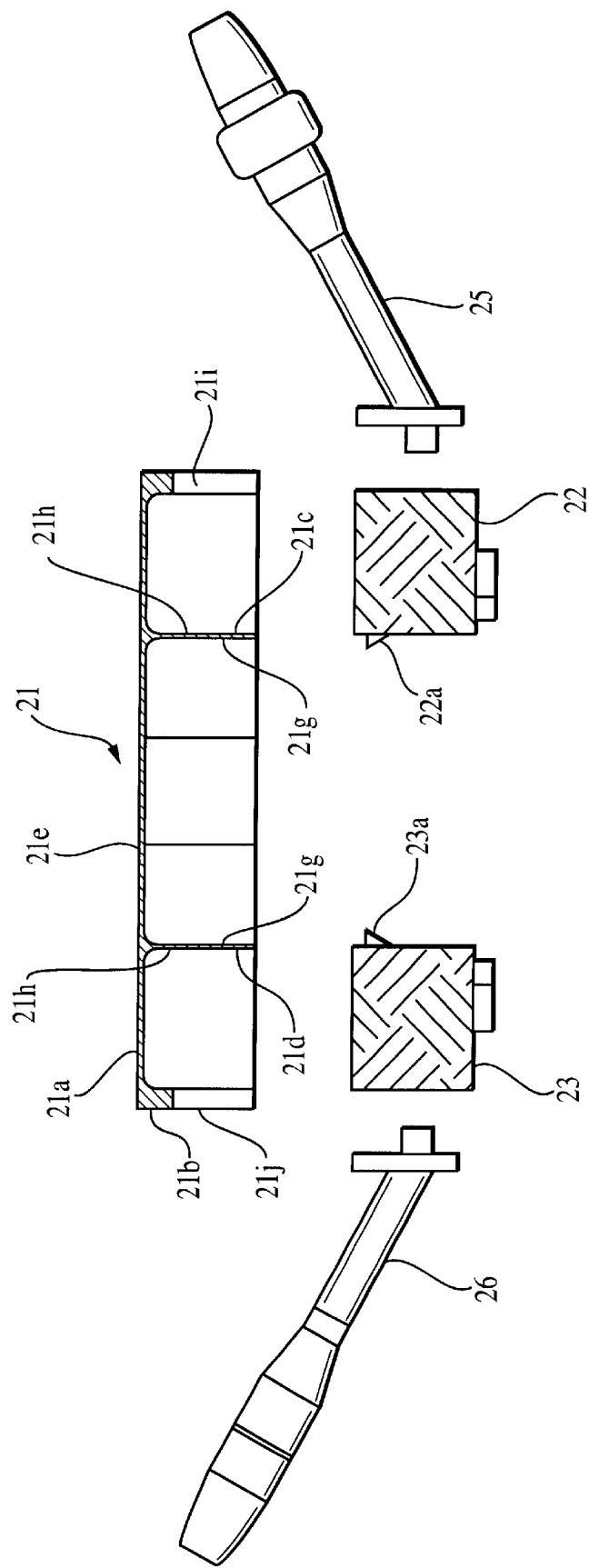
FIG. 6 is an exploded side view of the integrated connector device of FIG. 3.

The base shell 21 itself is constituted mainly of a top wall portion 21a, an outer sidewall portion 21b and first and second partitions 21c and 21d, as shown in FIGS. 4 to 6. The central zone of the top wall portion 21a is provided with a through-hole 21e (FIG. 6). The top wall portion 21a of the base shell 21 further includes four peripheral corners located adjacent but outside the area where a torus-shaped cable reel is installed (see FIG. 3). These four peripheral corners are formed into flange portions 21f adapted to fit to a steering column (not shown in the figures).

The first and second partitions 21c and 21d are respectively provided with a reel-locking hole 21g for fixing the cable reel 30, and a system-locking hole 21h for fixing the corresponding turn indicator-signal system 22 or lighting system 23. One side of the outer sidewall portion 21b adjacent the turn indicator-signal system 22 is provided with a notch 21i for passing a turn indicator-signal lever 25, and the other side of the outer sidewall portion 21b adjacent the lighting system 23 is provided with a similar notch 21j for passing a lighting lever 26.

The turn indicator-signal system 22 is prepared by mounting functional turn indicator-signal parts together, and is provided with a system-locking hook 22a. The turn indicator-signal system is then inserted as a single unit into the space formed between the outer sidewall portion 21b and the first partition 21c. The system-locking hook 22a is then passed through the system-locking hole 21h, and fixed thereto. The turn indicator-signal system 22 includes a circuit board carrying circuit elements such as a turn indicator-signal switching circuit, and is connected to an end of a turn indicator-signal lever 25. The turn indicator-signal lever 25 projects outwardly from the base shell 21 through the turn indicator-signal notch 21i.

Likewise, the lighting system 23 is prepared by mounting functional lighting parts together, and is provided with a system-locking hook 23a. The lighting system 23 is then inserted as a single unit into the space formed between the outer sidewall portion 21b and the second partition 21d. The system-locking hook 23a is then passed through the system-locking hole 21h, and fixed thereto. The lighting system 23 includes a circuit board carrying circuit elements such as a lighting switch circuit, and is connected to an end of a lighting lever 26. The lighting lever 26 projects outwardly from the base shell 21 through the lighting notch 21j.

In the prior art, the turn indicator-signal system 22 and the lighting system 23 are contained respectively in a separate housing. According to the present invention, they are now directly contained in the base shell 21.

Figure 7A:
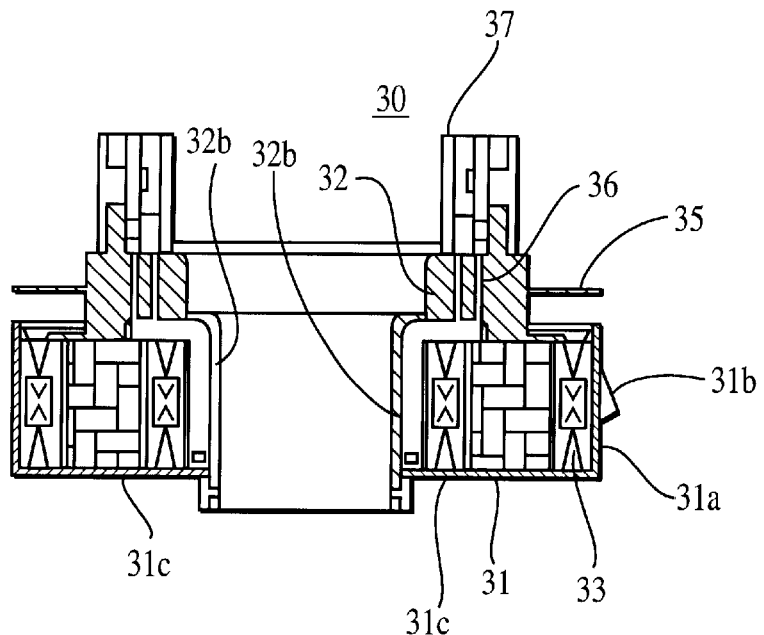
FIG. 7A is a cross-sectional side view of a cable reel incorporated in the integrated connector device according to the invention.
Figure 7B:
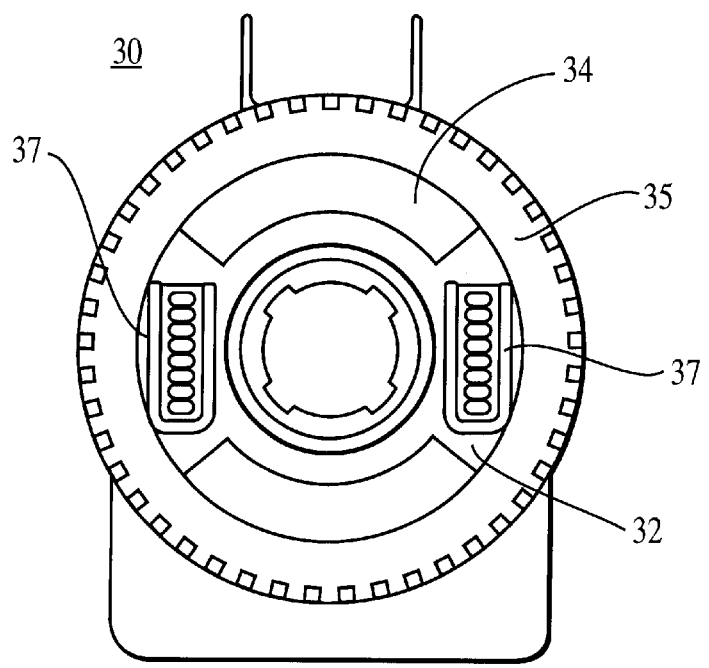
FIG. 7B is a top plan view of the cable reel of FIG. 7A.

As shown in FIGS. 4, 7A and 7B, the cable reel 30 is defined by a cable enclosure. The cable enclosure is substantially in the form of a hollow torus, which includes a bottom wall portion 31c, an outer sidewall portion 31a, a top wall portion 32a and an inner sidewall portion 32b. In this enclosure structure, the bottom wall portion and outer sidewall portion of the hollow torus form the fixed body 31, and the top wall portion and inner sidewall portion of the hollow torus form the mobile body 32 (e.g. rotor). The cable enclosure thus defined contains a flat cable 33 in a spiral. The top wall portion forming part of the mobile body 32 includes a cancel cam 34 (also refer to FIGS. 3 and 5), which is formed unitarily and in one piece therewith and extends upwardly therefrom. Likewise, the top wall portion in the mobile body 32 includes a scale portion 35, which is formed unitarily and in one piece therewith and extends radially outwardly therefrom. Further, the flat cable 33 is connected to a connector portion 37 through an electrical conductor 36 extending therefrom. The connector portion 37 is also formed unitarily and in one piece with the mobile body 32. The connector portion 37 can receive a cable terminal connected to the inflator of an airbag. The inflator of the airbag is thus connected to the electrical conductor 36.

The fixed body 31, to which the mobile body 32 is mounted in a freely rotatable way, has an outer sidewall portion 31a provided with locking hooks 31b. When the cable reel 30 is put into the base shell 21, the locking hooks 31b lock with the reel-hole 21g formed in the first and second partitions 21c and 21d.

The encoder 24 is provided in a rear peripheral zone 21b-1, with respect to the driver's position, formed between the outer sidewall portion 31a of the fixed body 31 (FIG. 7A) and the outer sidewall portion 21b of base-shell 21 (FIGS. 3 and 5). The encoder 24 includes a sensor 41 including a printed circuit board 40, and light-emitting and light-receiving elements 41a and 41b respectively connected thereto. The board and elements are integrally molded in a resin 42. The main scale 35 is rotated in conjunction with the mobile body 32 in the space 41c formed between the light-emitting element 41a and the light-receiving element 41b, so that the steering angle can be detected.

As mentioned above, the integrated connector device 20 according to the invention includes a base shell 21 including a first partition and a second partition, and a bottom opening being provided with a central axis. The base shell 21 and the cable reel 30 have respective central axes. The cable reel 30 is then mounted into the base shell 20 from beneath, with the respective central axes aligned. The cable reel 30 is thus contained between the first and second partitions, and locked therein. A turn indicator-signal system 22 is mounted between the first partition 21c and the outer sidewall portion 21b of the base shell 21 from the bottom opening thereof. Likewise, a lighting system 23 is mounted between the second partition 21d and the outer sidewall portion 21b of the base shell 21 from the bottom opening thereof. Both systems are then easily fixed with the corresponding partitions 21c and 21d by locking. An encoder 24 is initially fitted onto the cable reel 30 from outside its periphery, and mounted into the base shell 21 together with the cable reel 30. All the above members, together with the base shell 21, are subsequently fixed to a steering column by bolts.

In the above construction, the cable reel 30 is placed on the same horizontal level as the turn indicator-signal system 22 and the lighting system 23. Furthermore, the cancel cam 34 and the encoder 24 are placed on the same height level as the cable reel 30. Accordingly, the height of the integrated connector device 20 can be reduced. Further, the turn indicator-signal system 22 and the lighting system 23 are contained in the base shell 21, instead of in separate housings, so that the whole device can be miniaturized and rendered more compact, and requires a smaller space.

Furthermore, all functional parts for the turn indicator-signal and lighting systems are concentrated on a single base shell, and the base shell is placed on the same central axis as the steering shaft. Accordingly, the functional parts can be placed at positions precisely measured with respect to the central axis of the steering shaft, so that their positions can be defined very precisely.

Figure 1:
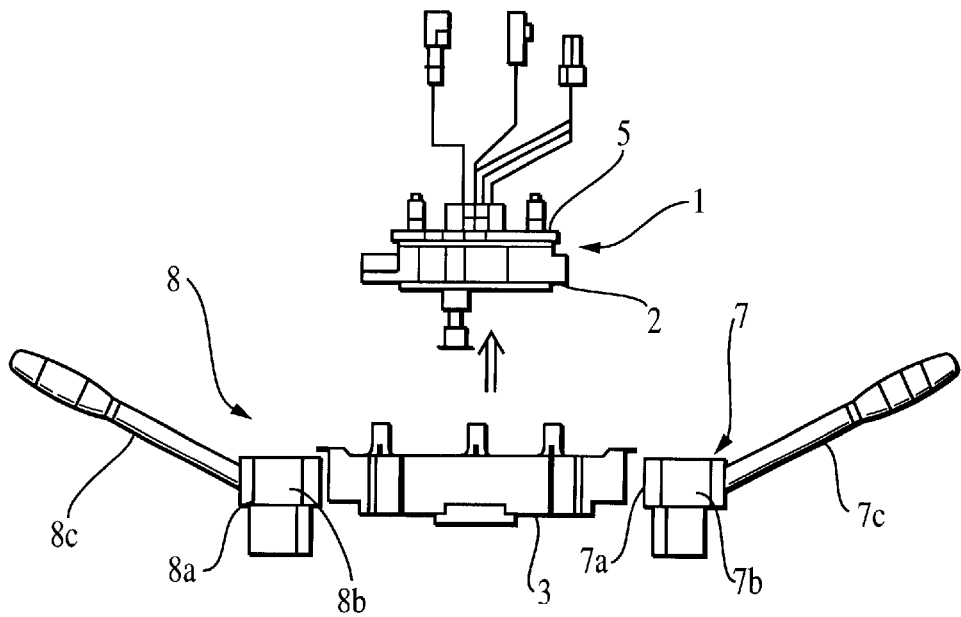
FIG. 1 is an exploded side view of a prior art connector device showing how combination switch bodies are mounted onto a cable reel.
Figure 2:
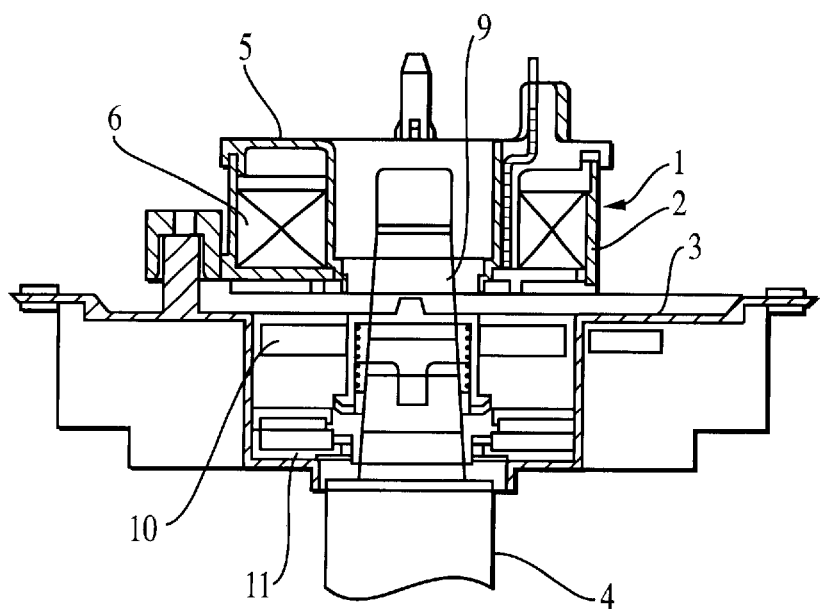
FIG. 2 is a cross-sectional side view of a prior art connector device.

When such a device is mounted in a car, the base shell 21 is fixed to the steering column (refer to FIG. 2), and the mobile body 32 of the cable reel 30, contained in the base shell 21, is fixed to the steering shaft.

In the integrated connector device including a cable reel and combined switch systems according to the invention, the systems that were classically contained in separate housings are now stored in the base shell, so that the separate housings are no longer required, and the necessary space can be reduced. Further, when separate housings are formed, a certain degree of clearance becomes necessary between the housings. As this clearance can be eliminated, the space necessary for a unitary connector device can be reduced.

Moreover, as the systems are not stored in separate housings, functional parts incorporated therein can be easily added to, or modified in, the systems, so that the device containing these systems acquires a wider use.

Further yet, the base shell of the invention contains a cable reel, a turn indicator-signal system, a lighting system, a cancel cam and an encoder all together. Accordingly, the height and width size of the device can be reduced, and the device is miniaturized and rendered lighter.

Although the invention has been described with reference to particular means, materials and embodiments, it is to be understood that the invention is not limited to the particulars disclosed and extends to all equivalents within the scope of the claims.

The present disclosure relates to subject matter contained in priority Japanese Application No. 2000-109858, filed on Apr. 11, 2000, which is herein expressly incorporated by reference in its entirety.

What is claimed:

1. An integrated connector device comprising a cable reel and combined switch systems, said integrated connector device comprising a base shell including: a top wall portion with a central through-hole; an outer sidewall portion extending downwardly from said top wall portion and having first and second lever notches; and first and second partitions respectively provided at a predetermined distance from said outer sidewall portion; said base shell having a central axis;

said cable reel comprising a fixed body and a mobile body, and having a central axis;

said combined switch systems at least comprising a turn indicator-signal system and a lighting system respectively comprising turn indicator-signal and lighting levers;

said cable reel being positioned in said base shell with said respective central axes aligned, such that said fixed body is positioned between said first and second partitions, said turn indicator-signal system is positioned between said outer sidewall portion and said first partition, said lighting system is positioned between said outer sidewall portion and said second partition, and said turn indicator-signal and lighting levers extend outwardly through said first and second lever notches.

2. The integrated connector device according to claim 1, wherein said mobile body of said cable reel positioned in said base shell comprises a top wall portion, and said top wall portion includes a cancel cam integrally formed therewith.

3. The integrated connector device according to claim 1, wherein said mobile body of said cable reel positioned in said base shell comprises a top wall portion, said fixed body of said cable reel comprises an outer sidewall portion, said top wall portion of said mobile body includes a scale portion integrally formed therewith, and further comprising an encoder provided between said outer sidewall portion of said fixed body and said outer sidewall portion of said base shell and spaced from the positions of said turn indicator-signal and lighting systems, such that said encoder detects the position of said scale portion.

4. The integrated connector device according to claim 2, wherein said mobile body of said cable reel positioned in said base shell comprises a top wall portion, said fixed body of said cable reel comprises an outer sidewall portion, said top wall portion of said mobile body includes a scale portion integrally formed therewith, and further comprising an encoder provided between said outer sidewall portion of said fixed body and said outer sidewall portion of said base shell and spaced from the positions of said turn indicator-signal and lighting systems, such that said encoder detects the position of said scale portion.

5. The integrated connector device according to claim 1, wherein said cable reel and said base shell are joined to a steering shaft having a central axis, such that said central axes of said cable reel and said base shell are aligned with said central axis of said steering shaft, and said turn indicator-signal system and said lighting system are positioned at a predetermined position with respect to said central axis of said steering shaft.

6. The integrated connector device according to claim 2, wherein said cable reel and said base shell are joined to a steering shaft having a central axis, such that said central axes of said cable reel and said base shell are aligned with said central axis of said steering shaft, and said turn indicator-signal system and said lighting system are positioned at a predetermined position with respect to said central axis of said steering shaft.

7. The integrated connector device according to claim 3, wherein said cable reel and said base shell are joined to a steering shaft having a central axis, such that said central axes of said cable reel and said base shell are aligned with said central axis of said steering shaft, and said turn indicator-signal system and said lighting system are positioned at a predetermined position with respect to said central axis of said steering shaft.

8. The integrated connector device according to claim 4, wherein said cable reel and said base shell are joined to a steering shaft having a central axis, such that said central axes of said cable reel and said base shell are aligned with said central axis of said steering shaft, and said turn indicator-signal system and said lighting system are positioned at a predetermined position with respect to said central axis of said steering shaft.

* * * * *